(12) United States Patent
Ishikawa

(10) Patent No.: US 8,891,433 B2
(45) Date of Patent: Nov. 18, 2014

(54) MOBILE COMMUNICATION SYSTEM AND OPERATION METHOD IN MOBILE COMMUNICATION

(75) Inventor: Yasuaki Ishikawa, Tokyo (JP)

(73) Assignee: NEC Corporation, Tokyo (JP)

(*) Notice: Subject to any disclaimer, the term of this patent is extended or adjusted under 35 U.S.C. 154(b) by 466 days.

(21) Appl. No.: 13/256,667

(22) PCT Filed: Feb. 23, 2010

(86) PCT No.: PCT/JP2010/052679
§ 371 (c)(1),
(2), (4) Date: Sep. 15, 2011

(87) PCT Pub. No.: WO2010/106880
PCT Pub. Date: Sep. 23, 2010

(65) Prior Publication Data
US 2012/0002705 A1 Jan. 5, 2012

(30) Foreign Application Priority Data

Mar. 16, 2009 (JP) ................................. 2009-063349

(51) Int. Cl.
*H04J 3/08* (2006.01)
*H04B 7/26* (2006.01)
*H04W 48/08* (2009.01)
*H04W 84/04* (2009.01)

(52) U.S. Cl.
CPC ............ *H04B 7/2606* (2013.01); *H04W 48/08* (2013.01); *H04W 84/047* (2013.01)
USPC ....................................................... 370/315

(58) Field of Classification Search
USPC ............................................... 370/310–350
See application file for complete search history.

(56) References Cited

U.S. PATENT DOCUMENTS

2007/0093268 A1* 4/2007 Hosono et al. ................ 455/561
2007/0197161 A1* 8/2007 Walke et al. ..................... 455/7

FOREIGN PATENT DOCUMENTS

CN 1773895 A 5/2006
CN 1953575 A 4/2007
(Continued)

OTHER PUBLICATIONS

International Search Report for PCT/JP2010/052679 mailed Apr. 20, 2010.

(Continued)

*Primary Examiner* — Andrew Chriss
*Assistant Examiner* — Kenan Cehic
(74) *Attorney, Agent, or Firm* — Sughrue Mion, PLLC

(57) ABSTRACT

A mobile communication system includes: a base station configured to form a cell and transmit a downlink signal which has been spread with a downlink scrambling code, toward the cell; a mobile station connected with the base station by radio when the mobile station is in the cell, and configured to communicate with a counter side station through the base station; and a relay station configured to receive the downlink signal, generate a limitation downlink signal showing a limitation area in which a function of the mobile station is limited, based on the downlink signal, and transmit the limitation downlink signal which has been spread with a specific scrambling code different from the downlink scrambling code, toward the limitation area. The downlink signal contains a base station peripheral cell list showing a scrambling code used in another base station on a periphery of the base station. The relay station determines the specific scrambling code based on the base station peripheral cell list when receiving the downlink signal.

3 Claims, 12 Drawing Sheets

(56) References Cited

FOREIGN PATENT DOCUMENTS

| | | |
|---|---|---|
| EP | 0998159 A1 | 5/2000 |
| JP | 9-275588 A | 10/1997 |
| JP | 11-220764 A | 8/1999 |
| JP | 2000278755 A | 10/2000 |
| JP | 2006140829 A | 6/2006 |
| JP | 2006017105 A | 1/2008 |
| JP | 2008-028724 A | 2/2008 |

OTHER PUBLICATIONS

Chinese Office Action for CN Application No. 201080012482.2 dated on Aug. 5, 2013 with English Translation.

* cited by examiner

Fig. 7A

| CELL LIST SCRAMBLING CODE | | |
|---|---|---|
| 1 | ... | ... RNC |
| 2 | ... | ... OTHER REP-UE (PERIPHERAL CELL LIST) |
| 3 | ... | ... OTHER REP-UE (NEIGHBOR CELL LIST) |
| 4 | ... | ... RNC |
| 5 | ... | ... NEIGHBOR |
| 6 | ... | ... NEIGHBOR |

PERIPHERAL CELL LIST: rows 1–4

NEIGHBOR CELL LIST: rows 5–6

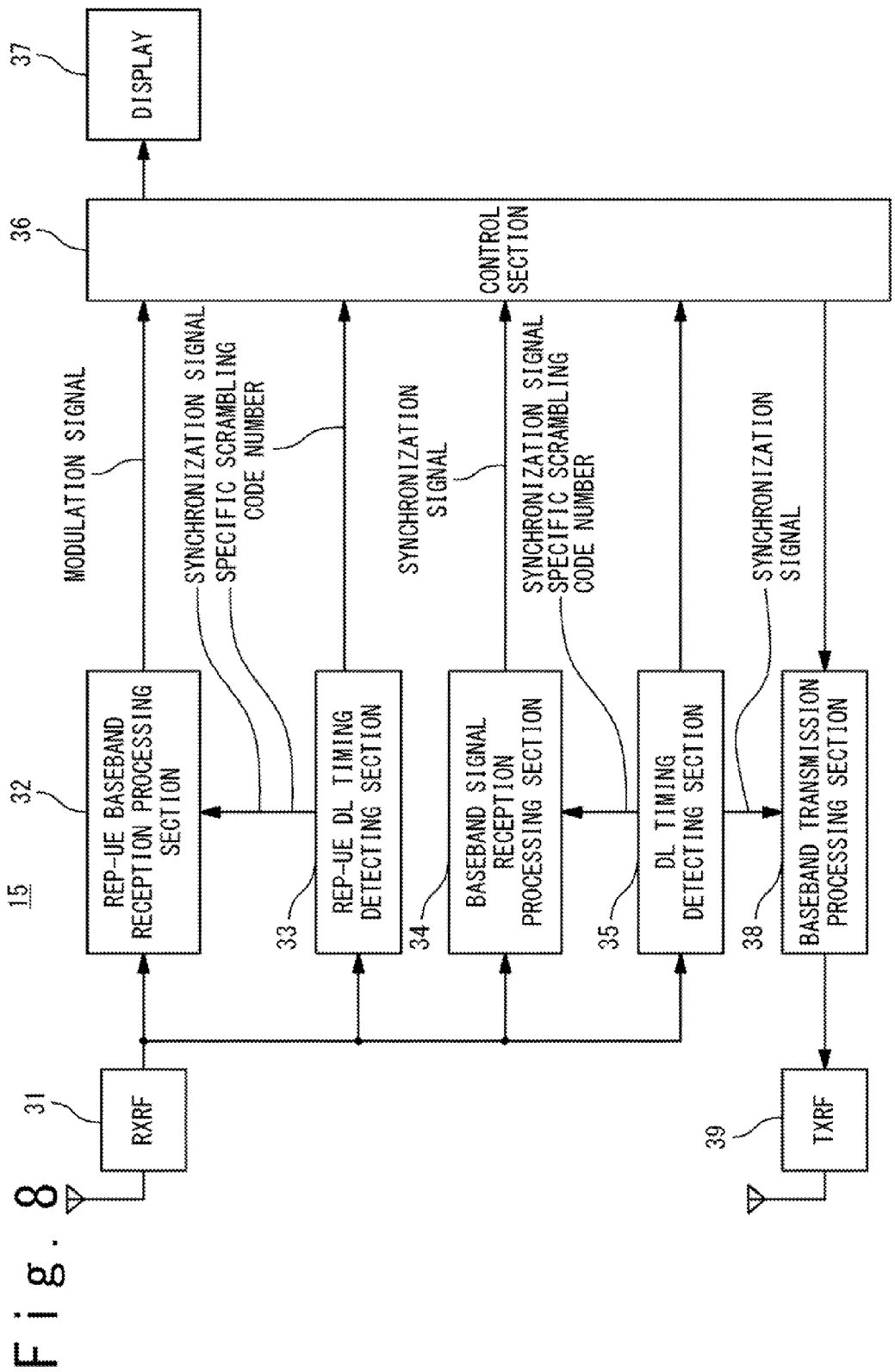

MOBILE COMMUNICATION SYSTEM AND OPERATION METHOD IN MOBILE COMMUNICATION

TECHNICAL FIELD

The present invention is related to a mobile communication system and an operation method in mobile communication.

BACKGROUND ARTS

In a mobile communication system, a mobile station is connected with a radio base station unit (hereinafter, to be referred to as a base station) by radio. The mobile station transmits and receives voice data, picture data, e-mail and so on through the base station to and from a counter side station. To meet the condition that the mobile station is in a communicable state, the mobile station must exist in a range in which electromagnetic wave from the base station reaches. A communication possible area extends as the improvement of the mobile communication system advances, and the mobile station can communicate in an extensive area.

However, because the communication becomes possible in the wide area, inconveniences sometimes occur oppositely. For example, in a hospital, there is a possibility that a malfunction of medical equipment is caused due to uplink electromagnetic wave outputted from the mobile station. Also, a call is generally prohibited in places where many persons get together, such as a train and a hotel lobby, and in places where the silence is requested, such as a library, a movie theater and a concert hall, considering inconveniences to the persons. However, it is only prohibited as a moral. If trying to communicate, it is possible to communicate.

On the other hand, a technique is proposed which limits a function of a mobile station in a specific area. For example, In Patent Literature 1 (JP 2000-278755A), a base station forms an electromagnetic wave area in another electromagnetic wave area by another base station and transmits a notice signal which has been spread with a specific spreading code which is different from a spreading code used by the other base station. The function of the mobile station is limited, in case of the reception of the notice signal which has been spread with the specific spreading code, from the base station.

Also, Patent Literature 2 (JP 2008-17105A) discloses a mobile communication system of a CDMA (code division multiple access) type in which communication is possible in a cell covered by a radio base station unit. In the mobile communication system, a mobile relay station converts a scrambling code of a downlink signal received from the radio base station unit into a specific code, and transmits the downlink signal which has been spread with the specific code toward a limitation area to limit communication. A mobile station limits the communication of a predetermined service and notifies the limitation of the communication of the predetermined service with an uplink signal, when receiving the downlink signal of the specific code transmitted from the mobile relay station. A control unit limits the communication of predetermined services to the mobile station when receiving the notification of limitation of the communication of the predetermined services by the uplink signal through the radio base station unit from the mobile station.

As mentioned above, when transmitting a signal, which has been spread with the specific scrambling code, from the mobile relay station, how to determine a scrambling code becomes a problem. This point will be described below.

The scrambling code is a code used to identify the cell. The number of scrambling codes is not infinite and the codes of 512 kinds are prescribed in the W-CDMA cellular system. To prevent interference, the scrambling code of an identical kind is set so as to be not used between cells in a short distance.

When determining the scrambling code, an electromagnetic wave reaching area is estimated for every base station through computer simulation based on the position and equipment of the base station and antenna configuration. The scrambling code of each cell is set so that the scrambling code of an identical kind is assigned to the base stations between which the reaching areas overlap. However, a designer must carry out the setting again when installing a mobile relay station and installing a new base station. Also, because the scrambling code is set using the computer simulation, there is a case that an error exists between the simulation result and an actual electromagnetic wave reaching area. In such a case, the interference has occurred and the design must be performed again. Therefore, the load of the designer becomes heavy. Also, the mobile relay station has a possibility to be installed in an unspecified place. It is difficult to grasp the installation position of the mobile relay station, and the scrambling code used by the mobile relay station for a communication provider.

The technique of determining the scrambling code is described in Patent Literature 3 (JP 2006-140829A). According to a method of setting a scrambling code described in Patent Literature 3, the base station transmits a temporary downlink scrambling code before the determination of a downlink scrambling code. Then, a final downlink scrambling code is determined based on a reception report from an existing mobile station and a peripheral cell list from the base station control unit.

Besides, the techniques which the present inventor could know include Patent Literature 4 (JP H11-220764A).

CITATION LIST

[Patent Literature 1]: JP 2000-278755A
[Patent Literature 2]: JP 2008-17105A
[Patent Literature 3]: JP 2006-110829A
[Patent Literature 4]: JP H11-220764A

SUMMARY OF THE INVENTION

However, the technique of using the temporary downlink scrambling code as described in Patent Literature 3 is based on a presupposition that the mobile station is present in the transmission area by the mobile relay station. Therefore, if there is not the mobile station in a limitation area, the scrambling code cannot be forever determined.

That is, one subject matter of the present invention is to provide a mobile communication system and an operation method of the mobile communication system, in which a scrambling code used by a relay station can be set surely and simply, in the mobile communication system that a mobile station receives a downlink signal from a base station through a relay station which forms a function limitation area.

A mobile communication system is provided with a base station configured to form a cell and transmit a downlink signal which has been spread with a downlink scrambling code toward the cell; a mobile station connected with the base station by radio when the mobile station is in the cell, and configured to communicate with a counter station through the base station; and a relay station configured to receive the downlink signal, generate a limitation downlink signal showing a limitation area n which a function of the mobile station is limited, based on the downlink signal, and transmit the limitation downlink signal which has been spread with a specific scrambling code different from the downlink scrambling code, toward the limitation area. The downlink signal contains a base station peripheral cell list showing a scrambling code used in another base station on a periphery of said base station of the base station. The relay station determines the specific scrambling code based on the base station peripheral cell list when receiving the downlink signal.

An operation method in a mobile communication system, the operation method includes: a step of transmitting a downlink signal which has been spread with a downlink scrambling code toward a cell by a base station; a step of communicating with a counter station through a base station by a mobile station which is connected with the base station by radio when the mobile station is in the cell; a step of transmitting toward a limitation area, a limitation downlink signal which shows the limitation area where a function of the mobile station is limited and which has been spread with a specific scrambling code by a relay station. The downlink signal contains a base station peripheral cell list showing the scrambling code used in another base station on a periphery of the base station. The transmitting a limitation downlink signal includes a step of determining the specific scrambling code based on the base station peripheral cell list when receiving the downlink signal.

According to the present invention, the mobile communication system and the operation method of the mobile communication system are provided, in which a scrambling code used by a relay station can be set surely and simply, in the mobile communication system that a mobile station receives a downlink signal from a base station through a relay station which forms a function limitation area.

BRIEF DESCRIPTION OF THE DRAWINGS

FIG. 7A is a conceptual diagram showing a cell list;

FIG. 8 is a block diagram showing the configuration of a mobile station;

DESCRIPTION OF EXEMPLARY EMBODIMENTS

Figure 1:
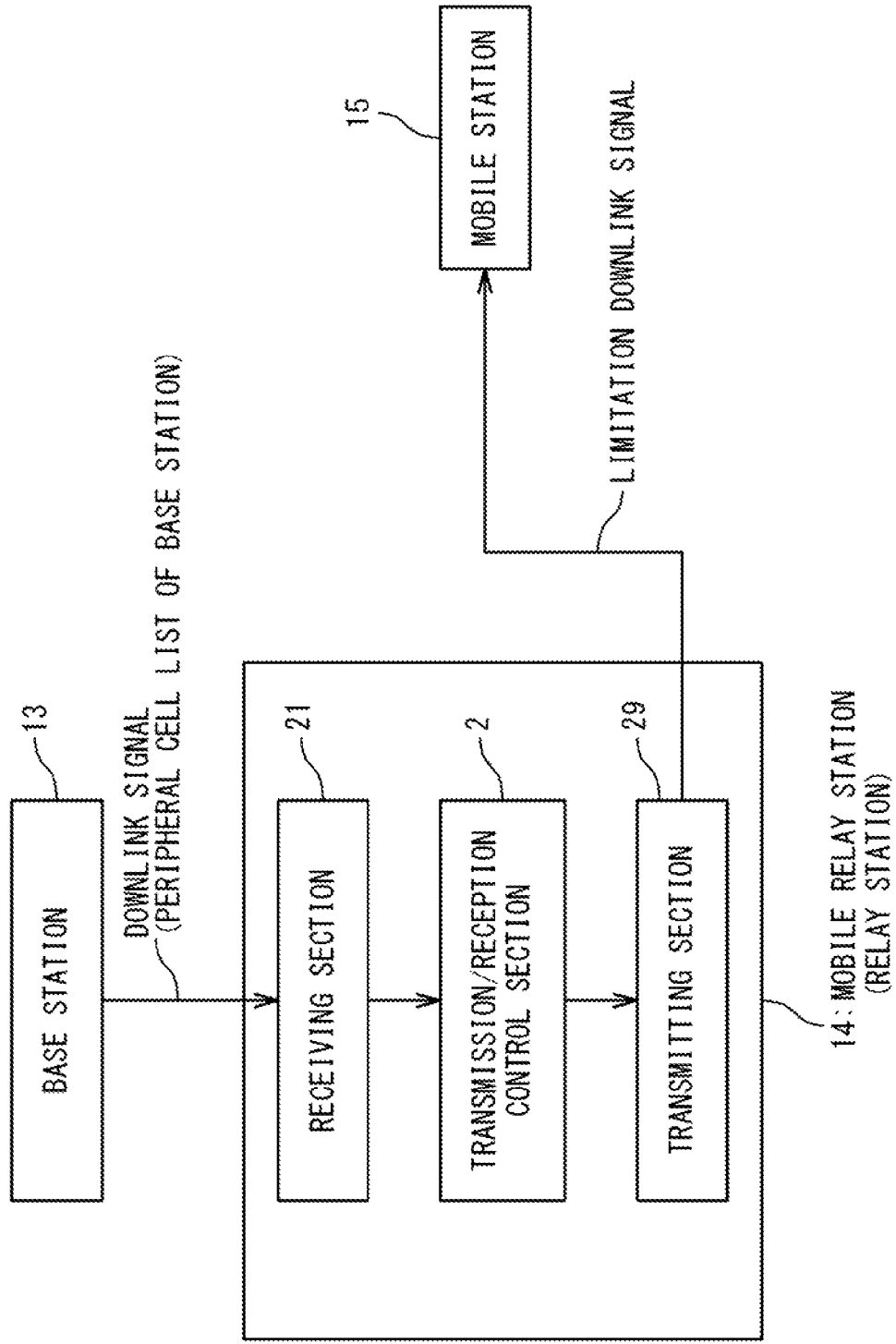
FIG. 1 is a block diagram schematically showing a configuration of a mobile communication system.
Figure 2:
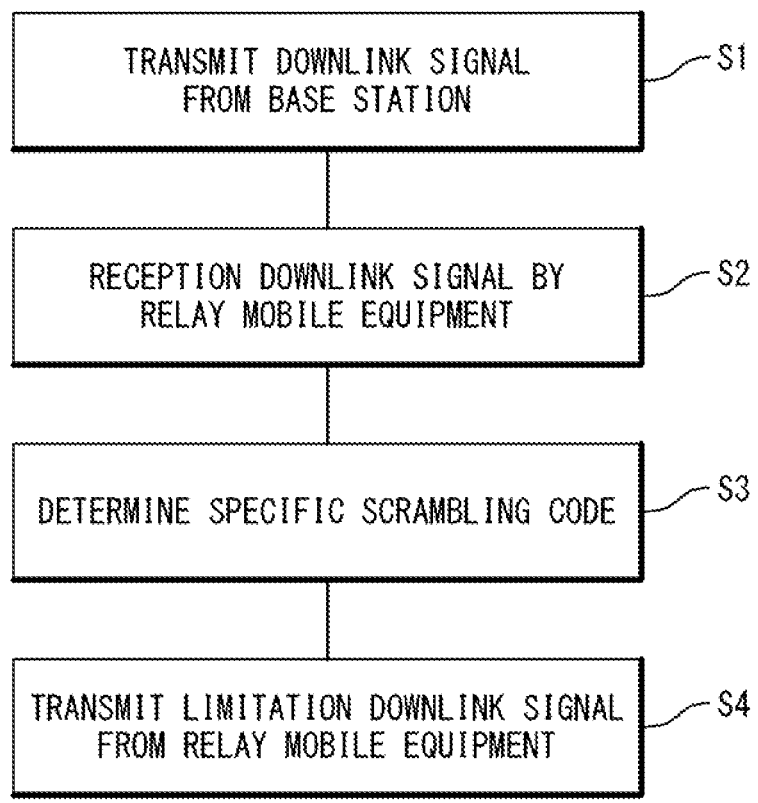
FIG. 2 is a flow chart schematically showing an operation of the mobile communication system.

Hereinafter, a mobile communication system of the present invention will be described below with reference to the attached drawings. FIG. 1 is a block diagram of the mobile communication system according to an embodiment. As shown in FIG. 1, the mobile communication system is provided with a base station 13, a mobile relay station 14 (relay station) and a mobile station 15. The mobile relay station 14 is provided with a receiving section 21, a transmission/reception control section 2 and a transmitting section 29. FIG. 2 is a flow chart schematically showing an operation of the mobile communication system. In the mobile communication system, the base station 13 transmits a downlink signal which has been spread with a downlink scrambling code toward a cell (Step S1). This downlink signal contains a base station peripheral cell list of the cell of the neighborhood of the base station showing a scrambling code used in another base station on the periphery of the base station 13. In the mobile relay station 14, the receiving section 21 receives the downlink signal (Step S2). In the mobile relay station 14, the transmission/reception control section 2 generates a limitation downlink signal showing an area where a function of a mobile station is limited. The transmission/reception control section 2 spreads the limitation downlink signal with a specific scrambling code different from the downlink scrambling code used by the base station 13. In this case, the transmission/reception control section 2 determines the specific scrambling code to be used based on the base station peripheral cell list (Step S3). The mobile relay station 14 transmits the generated limitation downlink signal toward the limitation area by the transmitting section 29 (Step S4).

Next, the mobile communication system 1 according to the present invention will be described in detail. In the present embodiment, the mobile communication system will be described by using a W-CDMA (Wideband Code Division Multiple Access) system as an example.

Figure 3:
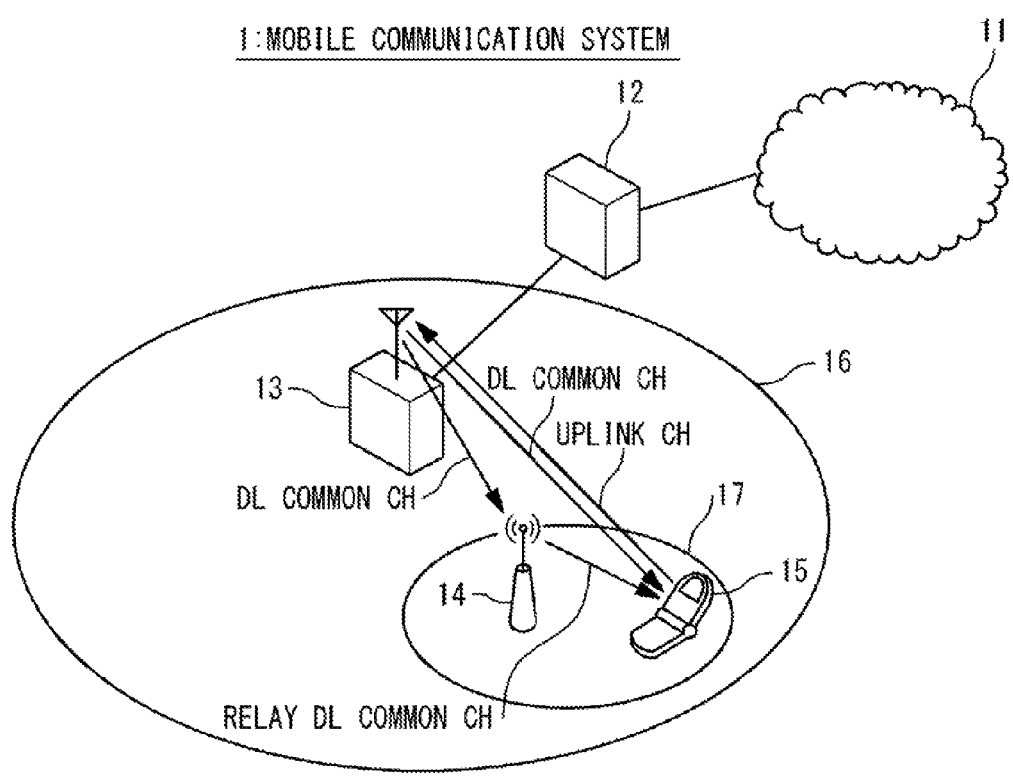
FIG. 3 is a diagram showing the configuration of the mobile communication system.

FIG. 3 is a block diagram showing the configuration of the mobile communication system 1 according to the present embodiment. The mobile communication system 1 is provided with a base station control unit 12 (RNC; Radio Network Controller), a plurality of base stations 13 (BTS; Base transceiver Station), the mobile relay station 14 and a plurality of mobile stations 15. In FIG. 3, in order to simplify the description, one of the plurality of base stations is shown as the base station 13. Similarly, one of the plurality of mobile stations is shown as the mobile station 15. Generally, the system provided with the base station control unit 12 and the base station 13 is called UTRAN (UMTS Terrestrial Radio Access Network).

The base station 13 is provided to allow the mobile station 15 to communicate with a counter side station. The base station 13 forms and sets a cell 16 and is communicable with the mobile station 15 which is in the cell 16. For example, an interface between the base station 13 and the mobile station 15 is a radio channel which is called Uu. A range of the cell 16 is determined based on the transmission power of the base station 13 and the ability of the base station 13 for searching an uplink signal from the mobile station 15.

The base station control unit 12 controls the base station 13. The base station control unit 12 is connected with the base station 13 by an interface of a wiring line which is called Iub. The base station control unit 12 communicates with the mobile station 15 through the base station 13. Also, the base station control unit 12 is connected with a mobile switching station 11 (CN: Core Network; referred to as the mobile switching station, including an upper layer network, in the present DESCRIPTION). The mobile switching station 11 is connected with a mobile station (the counter side station) which is owned by another user. Thus, the base station control unit 12 relays communication between the mobile station 15 and the counter side station. Also, the base station control unit 12 transmits and receives control signals for call processing to and from the mobile station 15 and performs call setting of a communication to the mobile station 15.

The mobile station 15 is owned by a user and is exemplified by a mobile phone terminal and so on. When being in the cell 16, the mobile station 15 is possible to communicate with the counter side station through the base station 13, the base station control unit 12, and the mobile switching station 11. For example, as this communication, calling, data communication and electric mail and so on are exemplified. Also, the mobile station 15 transmits and receives the control signal of the call processing to and from the base station control units 12.

The mobile relay station 14 is provided to notify the area in which the function of the mobile station 15 is limited, to the mobile station 15. The mobile relay station 14 forms and sets the limitation area 17. In FIG. 3, the mobile relay station 14 is arranged in the cell 16. The mobile relay station 14 transmits a signal showing the limitation area toward the limitation area 17 as a limitation downlink signal. The mobile station 15 receives this signal and recognizes the presence of itself in the limitation area 17 and limits the function. For example, the mobile relay station 14 is installed in locations where the communication should be limited; such as a hospital, a train, and a concert hall. It should be noted that in the present embodiment, a case that the mobile relay station 14 sets the limitation area 17 will be described. However, it is not always necessary to set the limitation area 17 by the mobile relay station 14. In place of the mobile relay station 14, a fixedly installed unit may set the limitation area 17.

Figure 4:
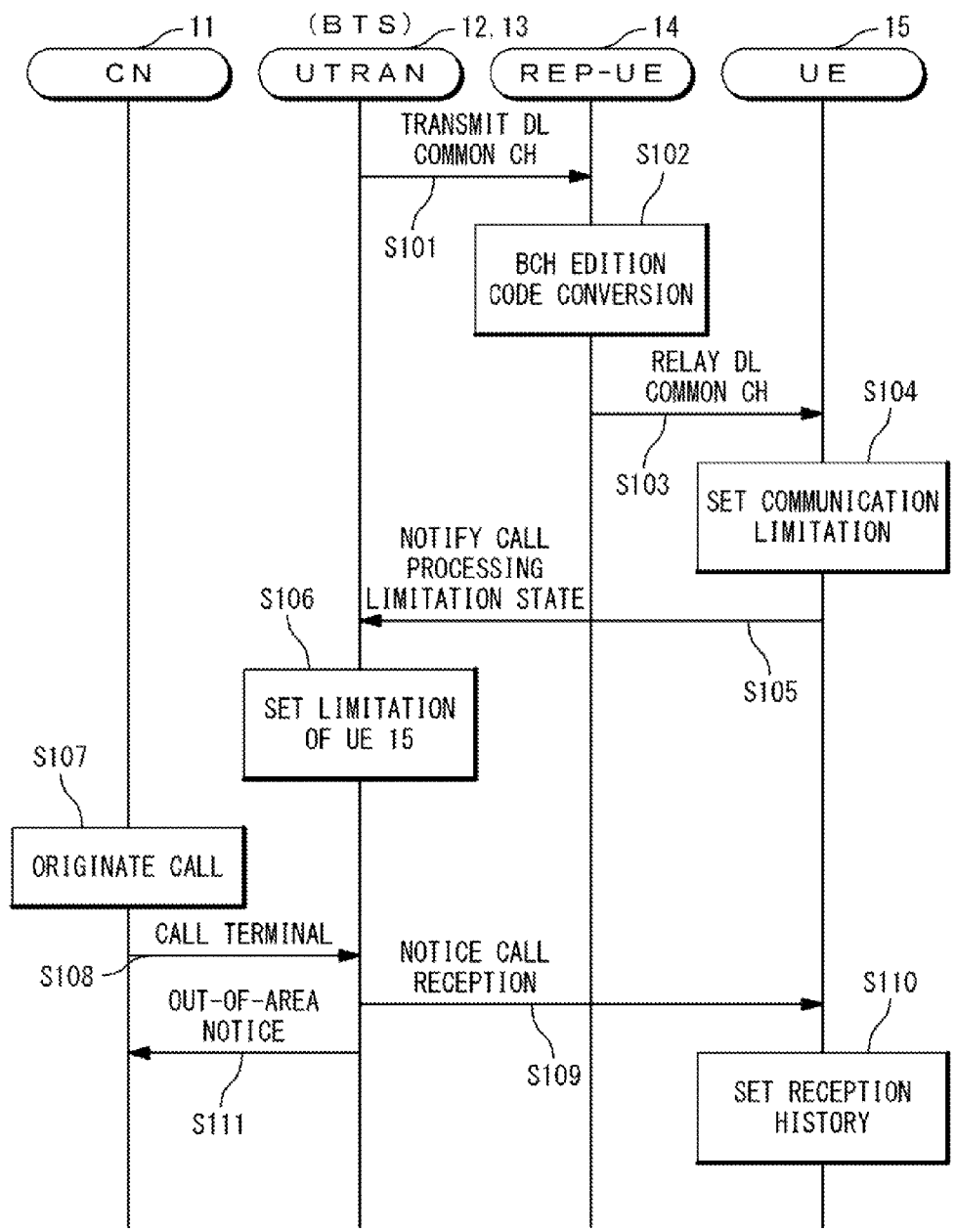
FIG. 4 is a sequence diagram showing the operation of the mobile communication system.

Referring to FIG. 4, the operation of the mobile communication system 1 according to the present embodiment will be described. The operation when the mobile station 15 is in the limitation area 17 is shown in FIG. 4.

Step S101: Transmission of DL Common CH

First, the base station (BTS) 13 transmits a downlink signal into the cell by a downlink common channel (DL common CH) which is common to a plurality of mobile stations. The downlink signal transmitted on the downlink common channel is spread with a downlink scrambling code. The downlink common channel is a channel to transmit data necessary for communication to the mobile station 15. In the mobile communication system 1, the base stations 13 neighbor to each other use different scrambling codes in an identical frequency band. For example, by the downlink common channel, data showing the downlink scrambling code used by the base station 13 and data to identify the base station 13 and so on are transmitted. The mobile station 15 receives the downlink signal from the downlink common channel, specifies the base station 13, and communicates with the base station 13 at appropriate timing.

Specifically, a primary synchronization channel (PSCH), a secondary synchronization channel (SSCH), a primary common pilot channel (P-CPICH), a primary common control physical channel (P-CCPCH) and so on are transmitted from the base station 13 by use of the downlink common channel. The PSCH and the SSCH are channels to synchronize with the base station 13. The P-CPICH is a channel used for specifying a scrambling code, measuring a reception level and so on.

The P-CCPCH contains a BCH (Broadcast Channel) which notice information is transmitted. This notice information of the BCH contains data showing the downlink scrambling code used in another base station on the periphery of the base station 13 (base station peripheral cell list).

Step S102: BCH Edition and Conversion of Scrambling Code

The mobile relay station 14 uses the downlink common channel from the base station 13 when notifying setting of the limitation area 17 toward the limitation area. That is, the mobile relay station 14 receives a downlink signal of the downlink common channel and specifies the downlink scrambling code. Then, the mobile relay station 14 edits the notice information which is contained in the BCH transmitted by use of the downlink common channel. Moreover, the mobile relay station 14 spreads the downlink signal after the edition, with a specific scrambling code different from the downlink scrambling code.

Step S103: Transmission of Relay Downlink Common Channel

The mobile relay station 14 relays the downlink signal spread with the specific downlink scrambling code toward the limitation area 17. That is, the mobile relay station 14 relays (the downlink signal on) the downlink common channel toward the limitation area 17. The channel used in this case (channel on which the signal spread with the specific downlink scrambling code is transmitted) is hereinafter called a relay downlink common channel, which is distinguished from the downlink common channel.

Step S104: Call Limitation Setting

The mobile station 15 receives (a downlink signal of) the relay downlink common channel, and recognizes that itself is in the limitation area 17. The mobile station 15 performs predetermined call limitation setting.

Step S105: Call Processing Limitation State Notice

The mobile station 15 generates an uplink signal indicating that it is in the call limitation area to notify to the base station 13 by using an uplink channel. The uplink signal is transmitted to the base station, control unit 12 through the base station 13. At this time, the mobile station 15 transmits the uplink signal in synchronization with the direct reception of data from the base station 13 on the downlink common channel, not the relay downlink common channel from the mobile relay station 14.

By transmitting the uplink signal in synchronization with the downlink common channel, it is not necessary to correctly synchronize the relay downlink common channel with the downlink common channel. Thus, it is not necessary to provide for the mobile relay station 14, a high function unit to synchronize the relay downlink common channel with the downlink common channel in a high accuracy. As a result, the mobile relay station can be cheaply configured and becomes possible to make size small.

Steps S106-S111: Limitation Setting

When receiving a notice of a call limitation setting state by the uplink signal, the base station control unit 12 sets call processing limitation to the mobile station 15 (Step S106). In this state, for example, when the mobile station 15 is called (Step S108) by a call originated from the mobile switching station 11 (step S101), the base station control unit 12 transmits a notice of a call reception to the mobile station 15 (Step S109), and issues a reception impossible notice to the mobile switching station 11 (Step S111). Also, the mobile station 15 receives the notice of call reception and performs update of history of a call reception such as a display of call reception on a display (Step S110).

Figure 5:
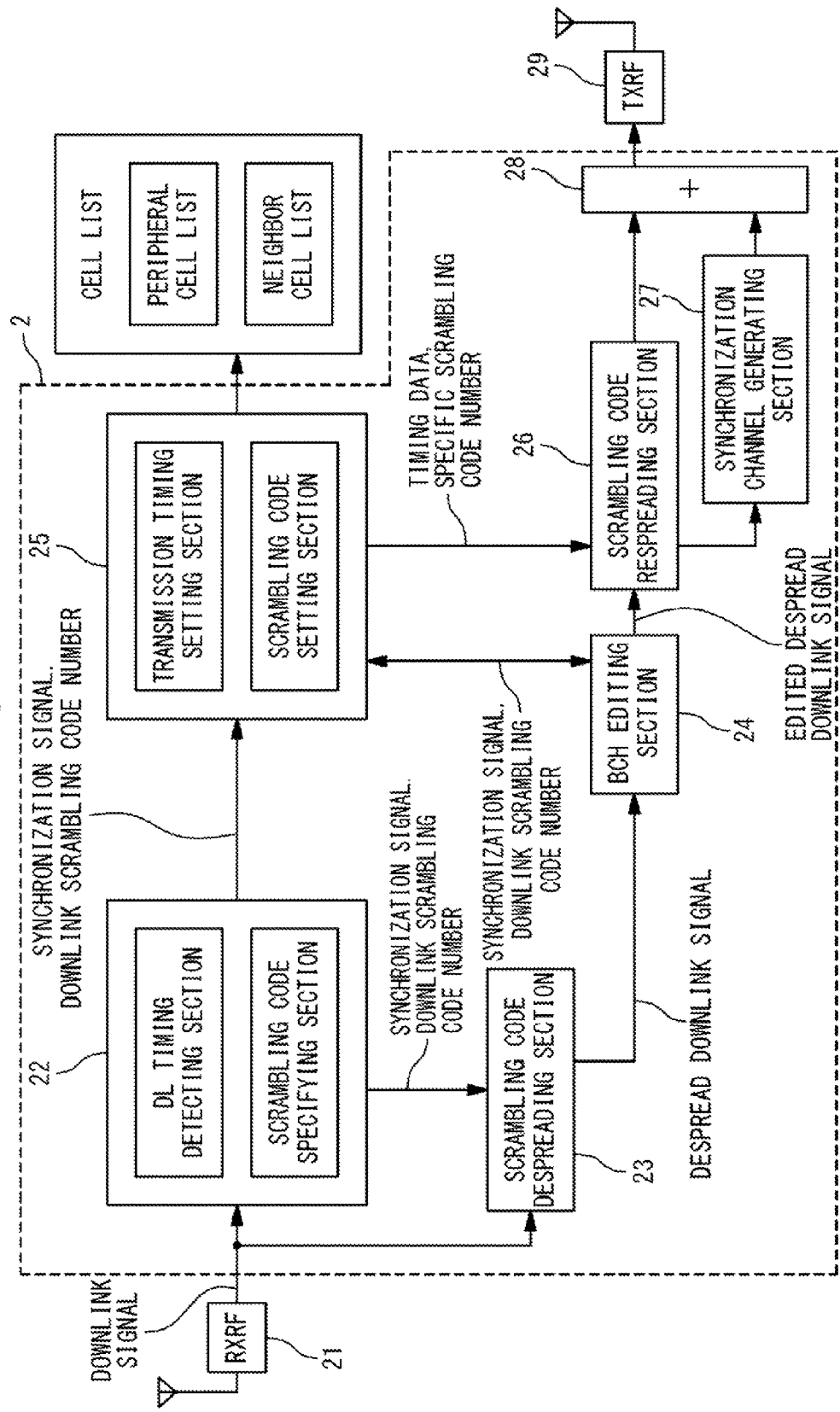
FIG. 5 is a block diagram showing a configuration of a mobile relay station.

Referring to FIG. 5, the mobile relay station 14 will be described in detail. FIG. 5 is a block diagram showing the mobile relay station 14.

The mobile relay station 14 has the receiving section (RXRF) 21, the transmission/reception control section 2 and the transmitting section (TXRF) 29. The transmission/reception control section 2 is provided with a downlink signal processing section 22, a scrambling code despreading section 23, a BCH editing section 24, a transmission condition setting section 25, a scrambling code re-spreading section 26, a synchronization channel generating section 27, and an adder 28.

Also, the scrambling code number which is used in the cell formed in the neighborhood of the mobile relay station 14 is stored in the form of the cell list the mobile relay station 14.

The receiving section 21 receives the downlink signal on the downlink common channel from the base station 13 and performs frequency conversion and analog-to-digital conversion on the downlink signal. The converted downlink signal is supplied to the downlink signal processing section 22 and the scrambling code despreading section 23.

The downlink signal processing section 22 has a downlink timing detecting section and a scrambling code specifying section. When acquiring the downlink signal from the radio receiving section 21, the downlink timing detecting section detects slot synchronization and frame synchronization by using PSCH, the SSCH and the P-CPICH and generates a synchronization signal. The scrambling code specifying section specifies a downlink scrambling code number by using these channels. The downlink signal processing section 22 notifies the generated synchronization signal and the specified downlink scrambling code number to the scrambling code despreading section 23 and the transmission condition setting section 25.

The functions of the above-mentioned radio receiving section 21 and the downlink signal processing section 22 may be the same as a part of the functions of a mobile station of the existing W-CDMA system. As mentioned previously, because it is not necessary to correctly synchronize the relay downlink common channel with the downlink common channel, it is not necessary to provide a high function unit as a timing detecting section. That is, it is not necessary to add new configuration as the radio receiving section 21 and the downlink signal processing section 22.

The scrambling code despreading section 23 performs despreading on the downlink signal acquired from the radio receiving section 21 by using the synchronization signal and the downlink scrambling code. Then, the scrambling code despreading section 23 transmits the despread downlink signal to the BCH editing section 24.

The BCH editing section 24 acquires the notice information which is contained in the BCH of the P-CCPCH from the despread downlink signal. As mentioned previously, a base station peripheral cell list is contained in this notice information. Therefore, the BCH editing section 24 acquires and transmits this base station peripheral cell list to transmission condition setting section 25.

The transmission condition setting section 25 has a transmission timing setting section and a scrambling code setting section. The scrambling code setting section adds a downlink scrambling code number to the cell list. Also, the scrambling code setting section adds the base station peripheral cell list acquired from the BCH editing section 24 to the cell list. Then, the scrambling code setting section determines a specific scrambling code used for the relay downlink common channel based on the cell list stored in the relay mobile section. The transmission condition setting section 25 notifies the determined specific scrambling code to the BCH editing section 24 and the scrambling code re-spreading section 26. Also, the transmission timing setting section determines the transmission timing of the relay downlink signal based on a synchronization signal acquired from the downlink signal processing section 22. The transmission timing setting section transmits data of the determined transmission timing to the scrambling code re-spreading section 26.

The BCH editing section 24 adds data showing the function limitation area and data showing the specific scrambling code number to the notice information of the despreading downlink signal. Thus, the despreading downlink signal is generated after editing. After editing, the despreading downlink signal is transmitted from the BCH editing section 24 to the scrambling code re-spreading section 26.

The scrambling code re-spreading section 26 re-spreads the despread downlink signal after the edition, with the specific downlink scrambling code. Thus, the re-spread downlink signal is generated. The re-spread downlink signal contains patterns of the P-CPICH and the P-CCPCH for the relay. The scrambling code re-spreading section 26 transmits the re-spread downlink signal to the adder 28.

Also, the scrambling code re-spreading section 26 transmits data showing the specific scrambling code number and the transmission timing to the synchronization channel generating section 27.

The synchronization channel generating section 27 generates a transmission pattern of SSCH and a fixed pattern of PSCH based on the specific scrambling code and the data showing the transmission timing, and transmits them to the adder 28.

The adder 28 adds the patterns acquired from synchronization channel generating section 27 to the re-spread downlink signal acquired from the scrambling code re-spreading section 26, and generates a relay downlink signal. The relay downlink signal is transmitted to a radio transmitting section 29.

The radio transmitting section 29 performs D/A conversion and frequency conversion on the relay downlink signal. Then, the radio transmitting section 29 transmits the relay downlink signal toward the limitation area 17 by using the relay downlink common channel.

By the above configuration, the mobile relay station 14 edits the notice information of the downlink signal received from the base station 13, converts the scrambling code into a specific scrambling code, and relays a signal after the conversion toward the limitation area 17 as the relay downlink signal.

On the other hand, in the mobile communication system 1 of the present embodiment, the mobile relay station 14 receives the downlink common channel and acquires the downlink scrambling code used by the base station 13. Also, when another mobile relay station exists on the periphery, the mobile relay station 14 receives (a signal on) the relay downlink common channel from the other mobile relay station. Thus, the mobile relay station 14 acquires the scrambling code used by the other mobile relay station and the scrambling codes used in the cells on the periphery of the other mobile relay station. Then, the mobile relay station 14 determines the specific scrambling code to be used for the relay downlink common channel based on these acquired scrambling codes. With this, the mobile communication system can operate in maintenance free. Below, this point will be described in detail.

First, a peripheral cell list and a neighbor cell list are contained in the cell list which is stored in the mobile relay station 14. The peripheral cell list shows a list of the scrambling code numbers which are used in the cells formed on the periphery of the mobile relay station 14. On the other hand, the neighbor cell list shows a list of the scrambling code numbers used in the downlink common channel which received by the mobile relay station 14. That is, the list of the scrambling code number used in the cell is shown in the neighborhood of the mobile relay station 14.

Thus, the mobile relay station 14 generates a relay cell list based on the cell list stored therein when transmitting (a signal on) the relay downlink common channel. Then, the mobile relay station 14 transmits the relay cell list on the relay downlink common channel. Here, a relay peripheral cell list and a relay neighbor cell list are contained in the relay cell list. How the relay peripheral cell list and the relay neighbor cell list are determined will be described later.

Figure 6:
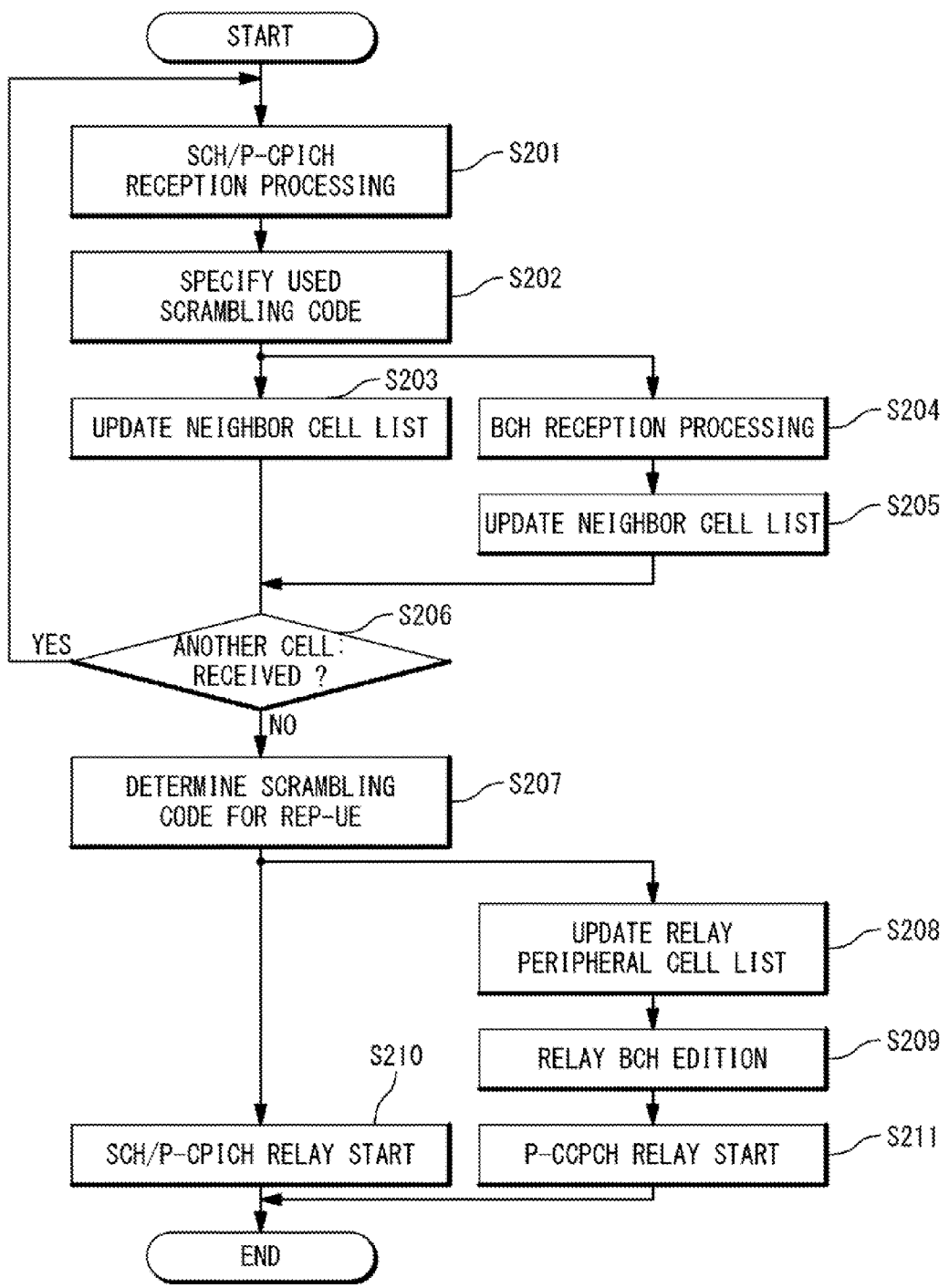
FIG. 6 is a flow chart showing an operation of the mobile relay station.

FIG. 6 is a flow chart showing an operation method of the mobile relay station 14.

The mobile relay station 14 first performs cell search as in the conventional mobile station, and receives the downlink common channel from the base station 13 or the relay downlink common channel from another mobile relay station. Then, the mobile relay station 14 receives a synchronization channel and a first common pilot channel which are contained in these channels (Step S201). Next, the mobile relay station 14, specifies the scrambling code to be used based on the synchronization channel and the first common pilot channel (Step S202). Next, the mobile relay station 14 adds the specified scrambling code number to the cell list stored therein as the neighbor cell list (Step S203). Moreover, the mobile relay station 14 performs reception processing of a BCH (Step S204). Then, the mobile relay station 14 acquires the cell list which is contained in the notice information of the BCH (base station peripheral cell list or relay cell list). The mobile relay station 14 adds the scrambling code number which is contained in the acquired cell list to the cell list in the mobile relay station 14 as a peripheral cell list. In this case, the mobile relay station 14 distinguishes whether the added scrambling code number is written in the base station peripheral cell list or in the relay cell list, and records the distinguishing result. Also, the mobile relay station 14 distinguishes whether the scrambling code number which is contained in the relay cell list is for a peripheral relay cell list or a neighbor relay-cell list, and adds the result (Step S205). Here, when the downlink common channel is received from another base station and another mobile relay station, the processing of steps S201 to S205 is repeated (Step S506).

FIG. 7A is a conceptual diagram showing an example of the cell list stored in the mobile relay station 14 through the processing up to step S506. In the example shown in FIG. 7A, as the cell list, 1 to 6 scrambling codes are stored. Among these, the first to fourth scrambling codes are stored as the peripheral cell list. On the other hand, fifth and sixth scrambling codes are stored as the neighbor cell list. Also, it is shown that the first and fourth scrambling codes are the scrambling codes written in the neighbor cell list of the base station control unit 12 (RNC). The second scrambling code is the scrambling code registered in the peripheral relay cell list of another neighbor mobile relay station neighbor to the mobile relay station 14. The third scrambling code is the scrambling code registered in the neighbor relay cell list of the other neighbor mobile relay station neighbor to the mobile relay station 14.

Next, the mobile relay station 14 determines a specific scrambling code (scrambling code for REP-UE) (Step S207). In this case, the mobile relay station 14 determines the specific scrambling code such that the scrambling codes contained in the cell list stored therein are not used. In the example of FIG. 7A, the first to sixth scrambling codes are never selected as the specific scrambling code. That is, the specific scrambling code is selected based on the following conditions (1) to (3).

(1) The scrambling codes written in the neighbor cell list of the mobile relay station itself are not used. That is, the scrambling codes used in the base station neighbor to the mobile relay station 14 and another neighbor mobile relay station are not used. In the example shown in FIG. 7A, the fifth and sixth scrambling codes are not used.

(2) The scrambling codes are not used which are contained in the cell lists' (the base station peripheral cell list and the relay cell list) received from the base station and the other mobile relay station are not used. In other words, the scrambling codes which exist in the cell lists collected at step 204. In the example shown in FIG. 7A, the first to fourth scrambling codes are not used.

(3) The specific scrambling code is randomly selected from a group of the unused scrambling codes under the conditions (1) and (2).

Figure 7B:
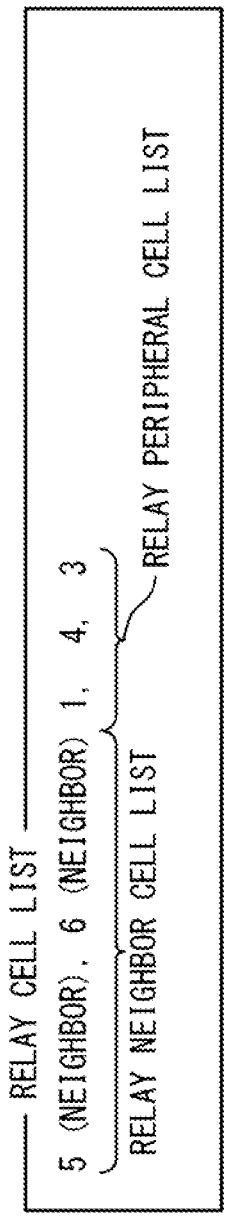
FIG. 7B is a conceptual diagram showing a cell list.

After determining the specific scrambling code, the mobile relay station 14 generates the relay cell list to be incorporated in the notice information of the BCH so as to meet the following conditions (4)-(6) (Step S208). It should be noted that an example of the relay cell list is shown in FIG. 7B.

(4) The mobile relay station 14 adds the scrambling codes received by itself to the relay cell list. In other words, the mobile relay station 14 adds the scrambling codes written in the neighbor cell list. In this case, the mobile relay station 14 adds a fact that the codes are contained in the neighbor cell list, to the scrambling codes as the neighbor relay cell list. That is, as shown in FIG. 7B, the fifth and sixth scrambling codes are added as the neighbor relay cell list.

(5) The mobile relay station 14 adds the scrambling codes contained in the base station peripheral cell list from the base station control unit 12, of the peripheral cell lists as the relay peripheral cell list. That is, as shown in FIG. 7B, the first and fourth scrambling codes are added as the relay peripheral cell list.

(6) Of the scrambling codes contained in the peripheral cell list of the notice information received from another neighbor mobile relay station, the mobile relay station 14 adds the scrambling codes written in the neighbor cell list of the other mobile relay station as the relay peripheral cell list. That is, as shown in FIG. 7B, the third scrambling code is added as the relay peripheral cell list. Here, because the second scrambling code is a code which is contained in the peripheral cell list of the other neighbor mobile relay station, it is not selected.

After that, the mobile relay station 14 edits a BCH such that the relay cell list and the data indicating presence in the limitation area are contained in the notice information (Step S209). After that, the mobile relay station 14 starts the relay processing of SCH, P-CPICH and P-CCPCH (Steps S210 and S211).

Through the above-mentioned processing, when determining the specific scrambling code, the mobile relay station 14 is sufficient to receive the downlink common channel from the base station and the relay downlink common channel from the mobile relay station. A special operation to determine the specific scrambling code is not required to the mobile station 15 and the base station control unit 12. That is, the mobile relay station 14 can determine the specific scrambling code automatically without the cooperation of the mobile station 15 and the base station control unit 12. Therefore, the mobile communication system can be set maintenance free.

Next, the configuration of the mobile station 15 will be described in detail. FIG. 8 is a block diagram showing the configuration of the mobile station 15. Here, only the necessary parts of the configuration of the mobile station 15 will be described. The mobile station 15 of the present embodiment is added with a function to limit its own function when the relay downlink signal is received, in addition to the function of the existing mobile station.

As shown in FIG. 8, the mobile station 15 is provided with a radio receiving section 31 (RXRF), a mobile relay station baseband reception processing section 32, a mobile relay station downlink timing detecting section 33, a baseband reception processing section 34, a downlink timing detecting section 35, a control section 36, a display 37, a baseband transmission processing section 38, and a radio transmitting section 39.

Figure 9:
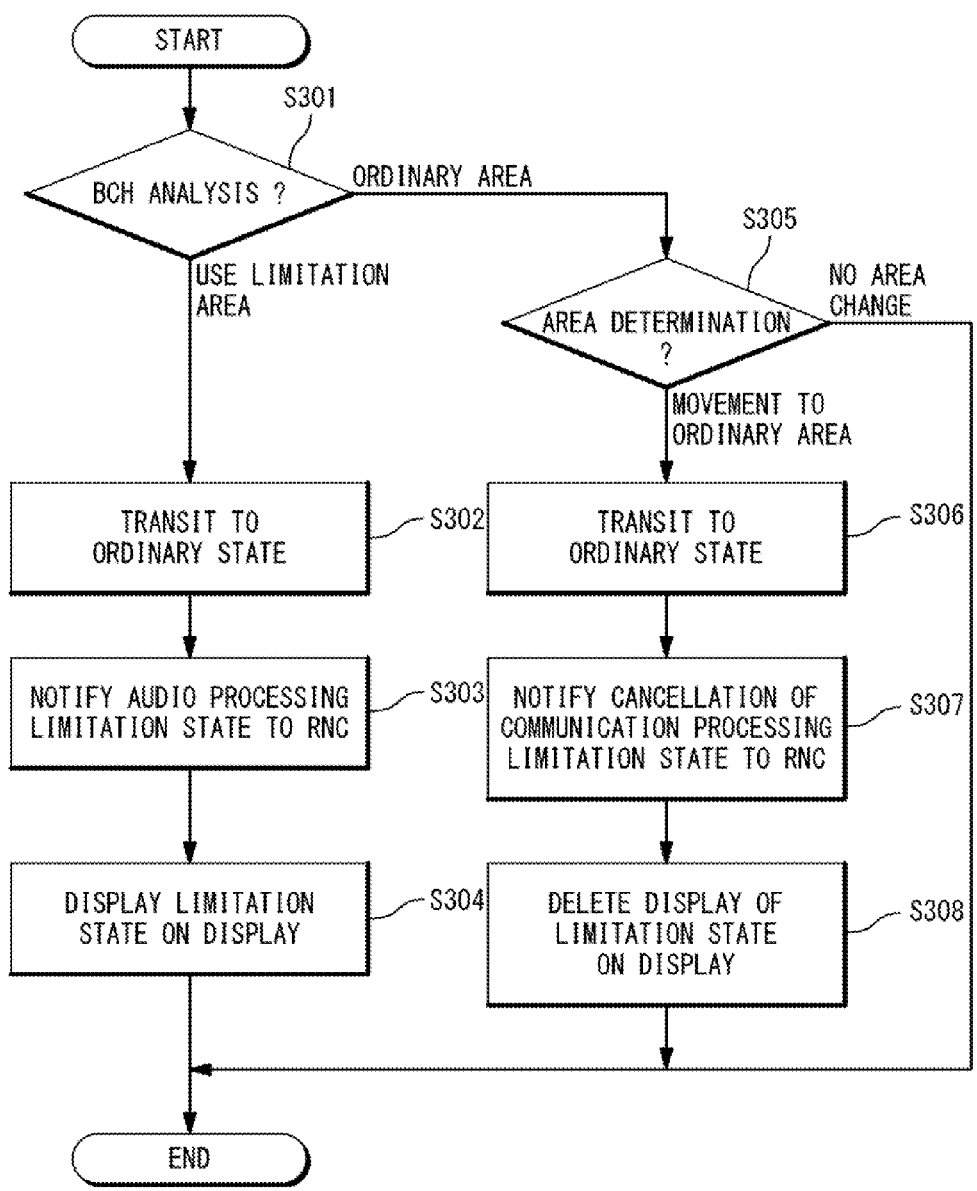
FIG. 9 is a flow chart showing the operation of the mobile station.

Referring to FIG. 9, an operation of the mobile station 15 will be described. FIG. 9 is a flow chart showing the operation of the mobile station 15 when call limitation processing is carried out.

Step S301: Analysis of Notice Information (BCH)

The mobile station 15 always analyzes the notice information of the received signal. That is, the radio receiving section 31 receives the downlink signal from the base station 13 and the relay downlink signal from the mobile relay station 14. Then, the radio receiving section 31 performs a frequency conversion on these signals, and moreover performs an A/D conversion to digitize. The radio receiving section 31 sends these digitized signals to the mobile relay station baseband reception processing section 32, the mobile relay station downlink timing detecting section 33, the baseband reception processing section 34 and the downlink timing detecting section 35.

The mobile relay station downlink timing detecting section 33 detects slot synchronization and frame synchronization from the relay downlink signal of the signal which is received from the radio receiving section 31, and generates a synchronization signal. The synchronization signal is sent to the mobile relay station baseband reception processing section 32. Also, the mobile relay station downlink timing detecting section 33 specifies a scrambling code group from the relay downlink signal, and moreover, specifies the specific scrambling code number. The specific scrambling code number is sent from the mobile relay station downlink timing detecting section 33 to the mobile relay station baseband reception processing section 32 and the control section 36.

The mobile relay station baseband reception processing section 32 performs the despreading on the relay downlink signal based on the acquired synchronization signal and the specific scrambling code number, and performs synchronization detection. Moreover, the mobile relay station baseband reception processing section 32 performs decoding to generate a demodulation signal and notifies the demodulation signal to the control section 36.

The downlink timing detecting section 35 detects the slot synchronization and the frame synchronization to the downlink signal from the base station 13, of the signals received from the radio receiving section 31, and generates the synchronization signal. The synchronization signal is sent to the baseband reception processing section 34 and the baseband transmission processing section 38. Moreover, the downlink timing detecting section 35 specifies the scrambling code group from the downlink signal, and moreover specifies the downlink scrambling code number. The downlink scrambling code number is sent from the downlink timing detecting section 35 to the baseband reception processing section 34 and the control section 36.

The baseband reception processing section 32 performs the despreading on the downlink signal based on the acquired synchronization signal and the downlink scrambling code number, and performs synchronization detection. Moreover, the baseband reception processing section 32 performs decoding to generate the demodulation signal and notifies the demodulation signal to the control section 36.

The control section 36 is a section which carries out call processing with the base station control unit 12 and the processing of application and so on. The control section 36 decodes the notice information of the relay downlink signal based on the specific downlink scrambling code number acquired from the mobile relay station downlink timing detecting section 33 and the demodulation signal acquired from the mobile relay station baseband reception processing section 32. In the same way, the control section 36 performs the demodulating or decoding on the notice information of the downlink signal. Then, the control section 36 determines whether the mobile station 15 is in the limitation area 17 or in the ordinary area, based on the notice information.

Step S302: Transition to Speech Processing Limitation State

When recognizing from the decoded notice information that the mobile station is in the limitation area 17, the control section 36 limits its own function.

Step S303: Notice of Speech Processing Limitation State

After that, the control unit 36 generates uplink data for notifying to the base station control unit 12 (RNC) that the mobile station is in a function limitation state, and sends to the baseband transmission processing section 38.

The baseband transmission processing section 38 sets the transmission timing of the uplink data based on the synchronization signal from the downlink timing detecting section 35. The baseband transmission processing section 38 performs modulation processing through the encoding and the spreading on the uplink data acquired from the control section 36 at the set transmission timing, and sends the processing result to the radio transmitting section 39 as the uplink signal. That is, the uplink signal is transmitted in synchronization with the downlink signal (on the downlink common channel) from the base station 13.

The radio transmitting section 39 performs the D/A conversion and the frequency conversion on the uplink signal acquired from baseband transmission processing section 38 and transmits it to the base station 13.

Generally, the mobile station 15 has a plurality of sets of the baseband reception processing section and the downlink timing detecting section for the softer handover and diversity handover functions. Therefore, one of the plurality of sets can be allocated to the mobile relay station baseband reception processing section 32 and the mobile relay station downlink timing detecting section 33. That is, to provide the mobile relay station baseband reception processing section 32 and the mobile relay station downlink timing detecting section 33, it is not necessary to add a new configuration to the mobile station 15.

Step S304: Display Limitation State

After that, the control section 36 displays that the base station 15 is in a call processing limitation state on a display 37.

Step S305: Area Determination

On the other hand, at step S301, when it is confirmed that the mobile station 15 is in the ordinary area, the control section 36 determines whether the mobile station 15 moved from the limitation area 17 to the ordinary area in the cell 16 or the mobile station is originally in the ordinary area. When the presence area is not changed, the control flow ends just as it is.

Step S306: Transition to Ordinary State

The mobile station 15 is changed from the call limitation state to the ordinary state when it is determined that the mobile station 15 moved from the limitation area 17 to the ordinary area 16.

Step S307: Notify Limitation State Cancellation

Moreover, the control section 36 generates an uplink signal showing cancellation of the call limitation state and notifies to the base station 13 through the baseband transmission processing section 38 and the radio transmitting section 39.

Step S308: Limitation State Cancellation

After that, the control section 36 cancels (extinguishes) a display showing the call limitation state on the display 31.

AS described above, according to the present embodiment, the mobile station 15 transmits the uplink signal showing the function limitation state, based on not the relay downlink signal (relay downlink common channel) from the mobile relay station 14 but the synchronization timing of the downlink signal (the downlink common channel) from the base station 13. Therefore, the mobile relay station 14 does not need a high performance function to correctly synchronize the relay downlink common channel with the downlink common channel. With this, the configuration of the mobile relay station 14 can be simplified.

Figure 10:
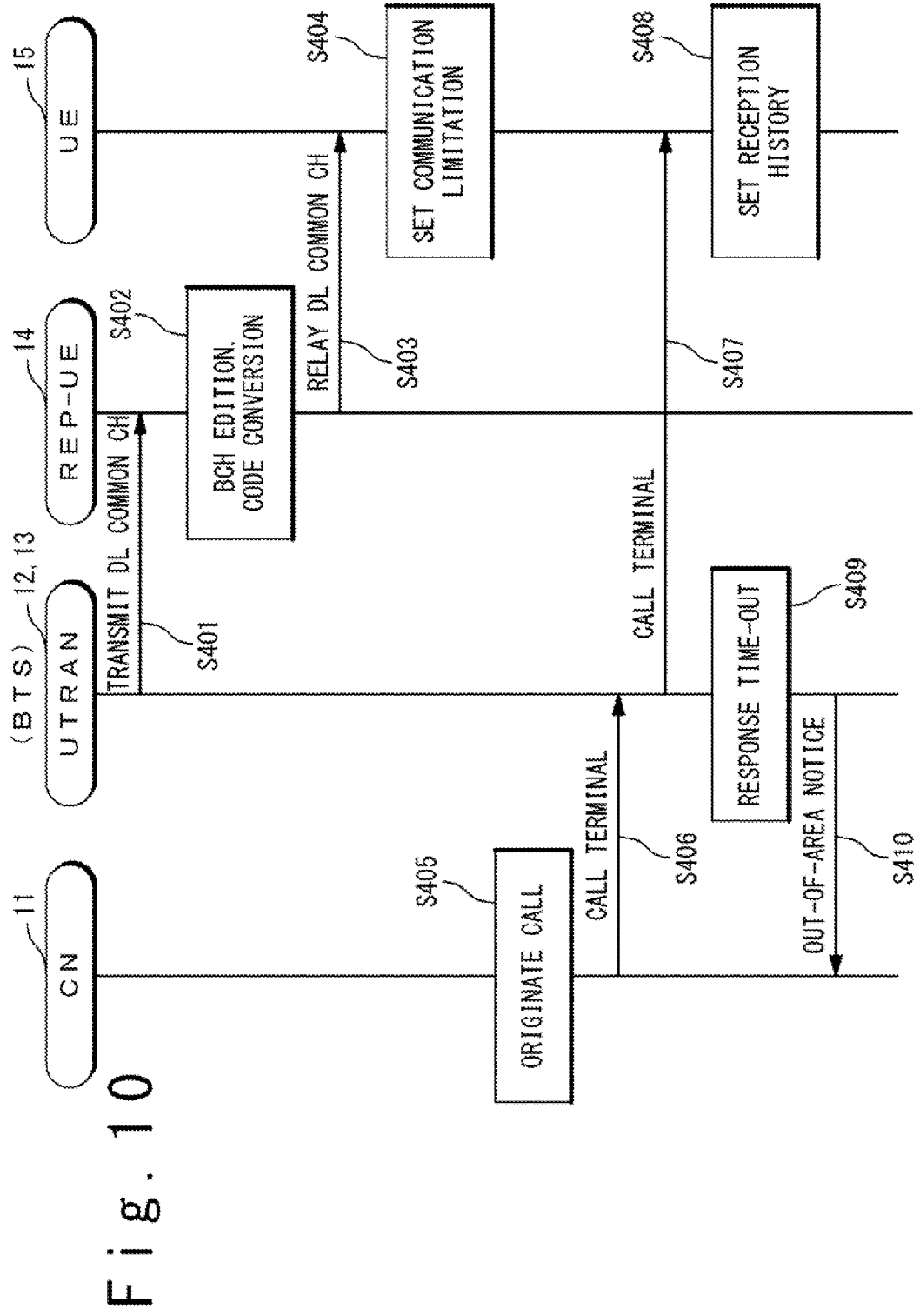
FIG. 10 is a flow chart showing the operation of the mobile communication system.

It should be noted that in the above-mentioned description, a case that the limitation area 17 is the call limitation area has been described. In the following description, a case that the limitation area 17 is not the call limitation area but a communication limitation area will be described. In case of the communication limitation area, the mobile station 15 does not transmit any uplink signal. FIG. 10 shows a sequence diagram in the operation of the whole mobile communication system 1 in this case.

The base station 13 transmits a signal of the downlink common channel (PSCH, SSCH, P-CPICH, P-CCPCH, and so on) toward the cell 16 by radio (Step S401). The mobile relay station 14 specifies the downlink scrambling code of the cell 16 and edits the notice information of the BCH. Then, the mobile relay station 14 converts the downlink scrambling code on the downlink common channel into the specific scrambling code (Step S402). The mobile relay station 14 relays the downlink common channel toward the limitation area 17 by the relay downlink common channel for a signal spread with the specific scrambling code (Step S303).

The mobile station 15 receives a signal on the relay downlink common channel from the mobile relay station 14 and recognizes from the notice information of the BCH that the mobile station 15 is in the limitation area 17 to which the communication limitation (the uplink output prohibition) is applied. The mobile station 15 performs a previous communication limitation setting (Step S404). At this time, unlike the previously mentioned communication limitation area, the uplink signal showing that the mobile station 15 is in the call processing limitation state is not transmitted to the base station 13.

For example, when the mobile station 15 is in the communication limitation state, it is supposed that the mobile station 15 receives a call signal (step S405) from another mobile station through the mobile switching station 11 (Step S406). At this time, if the position registration by the mobile station 15 is effective, the base station control unit 12 performs a terminal call to the mobile station 15 (Step S407). The mobile station 15 receives the call signal from the base station control unit 12 and performs the reception history setting such as a display of a call reception on the display 17 (Step S408). When elapse time of the response from the mobile station 15 exceeds a preset time (step S409), the base station control unit 12 issues an out-of-area notice to the mobile switching station 11 (Step S410).

Figure 11:
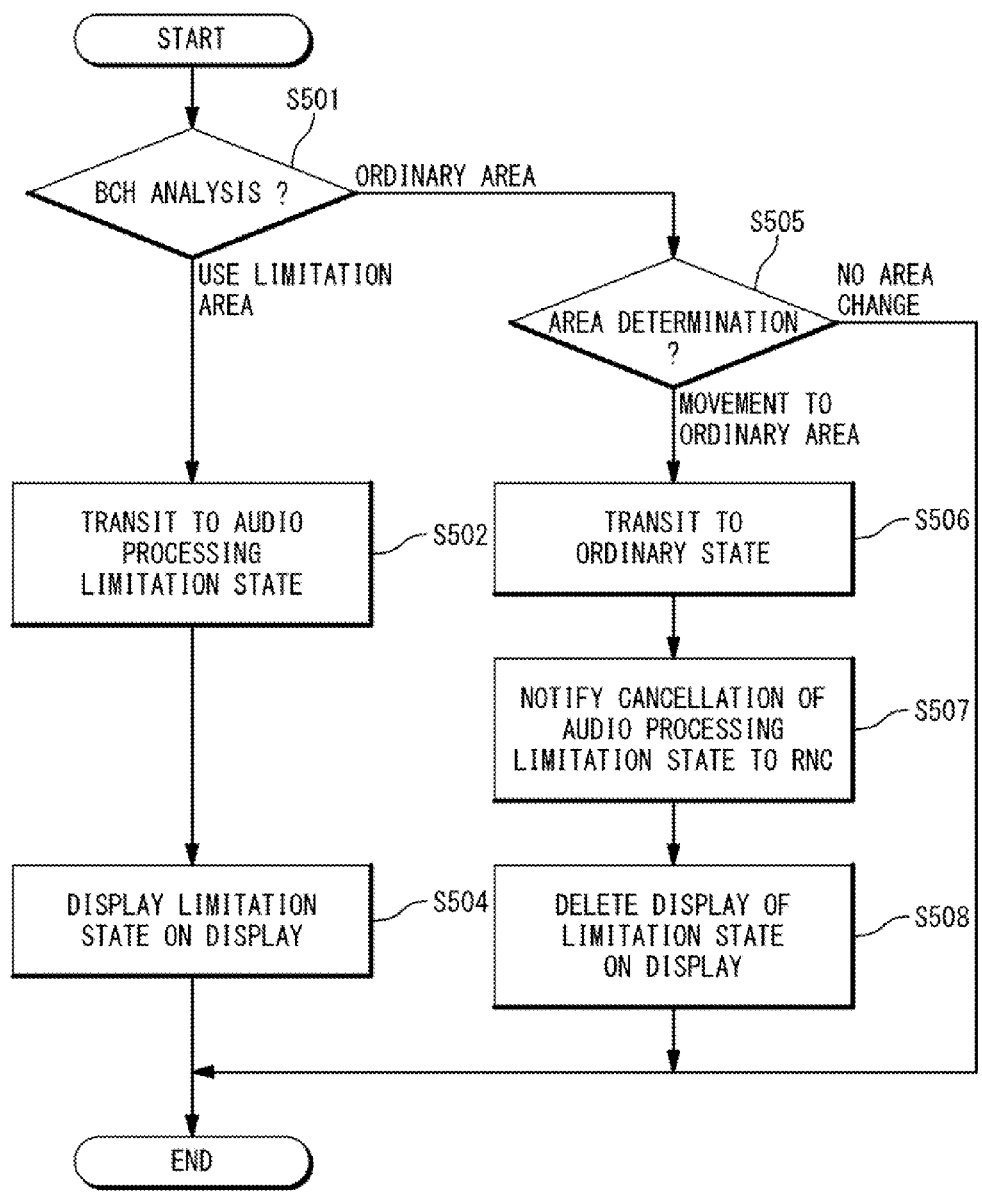
FIG. 11 is a flow chart showing the operation of the mobile station.

Next, the operation when the mobile station 15 is in the communication limitation area will be described in detail. FIG. 11 is a flow chart showing the operation of the mobile station 15.

The mobile station 15 always analyzes the BCH of the downlink signal (Step S501). When recognizing that the mobile station 15 is in the communication limitation area based on the notice information of the BCH, the control section 36 of the mobile station 15 transits to the communication limitation state (Step S502). Next, the mobile station 15 displays that the mobile station is in the communication limitation state, on the display 37 (Step S504). With this, the mobile station 15 in the limitation area 17 is set to the state that communication is limited. On the other hand, at step S501, when it is confirmed that the mobile station 15 is in the ordinary area, the area determination is performed of whether the mobile station moved from the limitation area 17 into the ordinary area in the cell 16 or the mobile station 15 is originally in the ordinary area (Step S505). When it is determined that the mobile station 15 moved from the limitation area 17 to the ordinary area, the mobile station 15 transits from the communication limitation state to the normal state (Step S506). After that, the mobile station 15 notifies the communication processing limitation state cancellation to the base station control unit 12 (step S507). Moreover, the mobile station 15 deletes the display of the limitation condition on the display 37 (Step S508).

In the above, referring to the embodiments, the present invention has been described. However, the present invention is not limited to the embodiments. A person in the art could make various modifications to the configuration and the operation of the present invention appropriately without departing away from the technical scope of the present invention.

It should be noted that the present application claims a priority based on Japanese Patent Application No. 2009-063349 filed on Mar. 16, 2009, and the disclosure thereof is incorporated herein by reference.

The invention claimed is:

1. A mobile communication system comprising:
    a base station configured to form a cell and transmit a downlink signal which has been spread with a downlink scrambling code, toward said cell;
    a mobile station connected with said base station by radio when said mobile station is in said cell, and configured to communicate with a counter side station through said base station; and
    a relay station configured to receive said downlink signal, generate a limitation downlink signal showing a limitation area in which a function of said mobile station is limited, based on said downlink signal, and transmit said limitation downlink signal which has been spread with a specific scrambling code different from the downlink scrambling code, toward said limitation area,
    wherein said downlink signal comprises a base station peripheral cell list showing a scrambling code used in another base station on a periphery of said base station,
    wherein said relay station determines said specific scrambling code based on said base station peripheral cell list when receiving said downlink signal,
    wherein said limitation downlink signal comprises a relay cell list showing the scrambling code used in said cell neighbor to said relay station,
    wherein when receiving a relay cell list from another relay station as another station relay cell list, said relay station determines the specific scrambling code based on said another station relay cell list,
    wherein said relay cell list comprises a relay neighbor cell list and a relay peripheral cell list
    wherein said relay neighbor cell list contains data used to specify said downlink scrambling code used in said base station, and a specific scrambling code used in said another relay station, and
    wherein said relay peripheral cell list contains data used to specify the scrambling code contained in said base station peripheral cell list and the scrambling codes written in said another station relay cell list and said relay neighbor cell list.

2. A relay station which is configured to receive a downlink signal from a base station, generate a limitation downlink signal showing a limitation area in which a function of a mobile station is limited, based on said downlink signal, and transmit toward said limitation area, said limitation downlink signal which has been spread with a specific scrambling code different from a downlink scrambling code which is used for said downlink signal,
- wherein said downlink signal comprises a base station peripheral cell list showing a scrambling code used in another base station on a periphery of said base station, and
- wherein said relay station determines said specific scrambling code based on said base station peripheral cell list when receiving said downlink signal,
- wherein said limitation downlink signal comprises a relay cell list showing the scrambling code used in said cell neighbor to said relay station,
- wherein when receiving a relay cell list from another relay station as another station relay cell list, said relay station determines the specific scrambling code based on said another station relay cell list,
- wherein said relay cell list comprises a relay neighbor cell list and a relay peripheral cell list,
- wherein said relay neighbor cell list contains data used to specify said downlink scrambling code used in said base station, and a specific scrambling code used in said another relay station, and
- wherein said relay peripheral cell list contains data used to specify the scrambling code contained in said base station peripheral cell list and the scrambling codes written in said another station relay cell list and said relay neighbor cell list.

3. An operation method in a mobile communication system, said operation method comprising:
- transmitting a downlink signal which has been spread with a downlink scrambling code toward a cell by a base station;
- communicating with a counter station through a base station by a mobile station which is connected with said base station by radio when said mobile station is in said cell;
- transmitting toward a limitation area, a limitation downlink signal which shows said limitation area where a function of said mobile station is limited and which has been spread with a specific scrambling code by a relay station,
- wherein said downlink signal contains a base station peripheral cell list showing the scrambling code used in another base station on a periphery of said base station,
- wherein said transmitting a limitation downlink signal comprises:
- determining said specific scrambling code based on said base station peripheral cell list when receiving said downlink signal,
- wherein said limitation downlink signal contains data showing a relay cell list showing the scrambling code used in the cell neighbor to said relay station,
- wherein said transmitting a limitation downlink signal spread with a specific scrambling code comprises:
- determining said specific scrambling code based on said another station relay cell list when receiving said relay cell list from another relay station as said another relay station cell list,
- wherein said relay cell list comprises a relay neighbor cell list and a relay peripheral cell list,
- wherein said relay neighbor cell list comprises data used to specify said downlink scrambling code used in said base station and data used to specify a specific scrambling code used in said another relay station, and
- wherein said relay peripheral cell list comprises data used to specify the scrambling code contained in said base station peripheral cell list and the scrambling code written in said relay neighbor cell list of said another relay station cell list.

* * * * *